(12) United States Patent
Bacon-Brown et al.

(10) Patent No.: US 11,988,859 B2
(45) Date of Patent: *May 21, 2024

(54) REFLECTIVE WIRE GRID POLARIZER WITH SHAPED RIBS

(71) Applicant: Moxtek, Inc., Orem, UT (US)

(72) Inventors: Daniel Bacon-Brown, Orem, UT (US); Michael Black, Orem, UT (US); R. Stewart Nielson, Pleasant Grove, UT (US); Bradley R. Williams, Pocatello, ID (US); Benjamin Downard, Draper, UT (US); Jeffrey H. Rice, South Jordan, UT (US); Jim Pierce, Sandy, UT (US)

(73) Assignee: Moxtek, Inc., Orem, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/974,318

(22) Filed: Oct. 26, 2022

(65) Prior Publication Data

US 2023/0046399 A1 Feb. 16, 2023

Related U.S. Application Data

(63) Continuation of application No. 16/919,513, filed on Jul. 2, 2020, now Pat. No. 11,513,271.

(60) Provisional application No. 62/875,093, filed on Jul. 17, 2019.

(51) Int. Cl.
*G02B 5/30* (2006.01)

(52) U.S. Cl.
CPC ......... *G02B 5/3058* (2013.01); *G02B 5/3075* (2013.01)

(58) Field of Classification Search
None
See application file for complete search history.

(56) References Cited

U.S. PATENT DOCUMENTS

| | | | |
|---|---|---|---|
| 6,243,199 B1 | 6/2001 | Hanson et al. | |
| 6,532,111 B2 | 3/2003 | Kurtz et al. | |
| 6,665,119 B1 | 12/2003 | Kurtz et al. | |
| 6,785,050 B2* | 8/2004 | Lines | G02B 5/3058 |
| | | | 359/485.05 |
| 7,570,424 B2 | 8/2009 | Perkins et al. | |
| 7,961,393 B2 | 6/2011 | Perkins et al. | |
| 9,360,608 B2 | 6/2016 | Takahashi et al. | |
| 9,632,224 B2* | 4/2017 | Nielson | H04N 9/3167 |
| 10,261,359 B1 | 4/2019 | Lee et al. | |
| 10,649,121 B2 | 5/2020 | Li et al. | |
| 11,249,234 B2 | 2/2022 | Nielson | |
| 11,513,271 B2* | 11/2022 | Bacon-Brown | G02B 5/3058 |
| 2006/0039069 A1 | 2/2006 | Hayashi et al. | |
| 2007/0242352 A1 | 10/2007 | MacMaster | |

(Continued)

FOREIGN PATENT DOCUMENTS

JP 2013130598 A 7/2013

*Primary Examiner* — Derek S. Chapel
(74) *Attorney, Agent, or Firm* — Thorpe North & Western, LLP

(57) ABSTRACT

A reflective wire grid polarizer (WGP) can include an array of wires 12 on a face of a substrate 11, with channels 15 between adjacent wires 12. The wires 12 can have certain characteristics for WGP performance, such as index of refraction, alternating high/low index continuous thin films, thickness of layer(s), duty cycle, reflective rib shape, a curved side of transparent ribs 21 or 32, aspect ratio, or combinations thereof.

15 Claims, 8 Drawing Sheets

(56) References Cited

U.S. PATENT DOCUMENTS

| | | |
|---|---|---|
| 2008/0316599 A1 | 12/2008 | Wang et al. |
| 2009/0066885 A1 | 3/2009 | Kumai |
| 2010/0134719 A1 | 6/2010 | Johns et al. |
| 2012/0086887 A1* | 4/2012 | Lee ................... G02B 5/3058 |
| | | 359/485.05 |
| 2012/0105745 A1 | 5/2012 | Kumai |
| 2013/0120672 A1 | 5/2013 | Kumai |
| 2016/0054497 A1 | 2/2016 | Takahashi |
| 2018/0136515 A1* | 5/2018 | Nam ................... G02B 5/3058 |
| 2019/0271803 A1 | 9/2019 | Gao |
| 2019/0331840 A1* | 10/2019 | Takada ............... G02B 5/3058 |
| 2020/0174173 A1 | 6/2020 | George |
| 2020/0355860 A1 | 11/2020 | Shibuya |
| 2020/0371277 A1 | 11/2020 | Oowada |
| 2021/0063622 A1* | 3/2021 | Nielson ................ G02B 1/002 |
| 2021/0199869 A1* | 7/2021 | Shibuya ............. G02B 5/3058 |
| 2024/0036241 A1* | 2/2024 | Sasaki ................. B60K 35/23 |

* cited by examiner

REFLECTIVE WIRE GRID POLARIZER WITH SHAPED RIBS

CLAIM OF PRIORITY

This application is a continuation of US Patent Application Number U.S. Ser. No. 16/919,513, filed on Jul. 2, 2020, now U.S. Pat. No. 11,513,271, which claims priority to U.S. Provisional Patent Application No. 62/875,093, filed on Jul. 17, 2019, which are incorporated herein by reference.

FIELD OF THE INVENTION

The present application is related generally to reflective wire grid polarizers.

BACKGROUND

A wire grid polarizer (WGP) can divide light into two different polarization states. One polarization state can primarily pass through the WGP and the other polarization state can be primarily absorbed or reflected. The effectiveness or performance of WGPs is based on high transmission of a predominantly-transmitted polarization (sometimes called Tp) and minimal transmission of an opposite polarization (sometimes called Ts).

Typically, a change in WGP structure to increase Tp will also increase Ts, and a change in WGP structure to decrease Ts will also decrease Tp. Therefore, some WGPs are designed for high Tp and others designed for low Ts.

It can be beneficial to have high contrast (Tp/Ts). Contrast can be increased by increasing transmission of the predominantly-transmitted polarization (e.g. increasing Tp) and by decreasing transmission of the opposite polarization (e.g. decreasing Ts).

Particularly if the reflected light beam will be used, it can be important to have a very low reflection (e.g. low Rp) of the primarily transmitted polarization. The percent reflection of the opposite polarization (Rs) can also be a useful indicator of polarizer performance.

SUMMARY

It has been recognized that it would be advantageous to improve wire grid polarizer (WGP) performance, including increasing transmission of a predominantly-transmitted polarization (e.g. increasing Tp), decreasing transmission of an opposite polarization (e.g. decreasing Ts), increasing contrast (e.g. Tp/Ts), and low reflection (e.g. low Rp) of the predominantly-transmitted polarization state. The present invention is directed to various embodiments of WGPs that satisfy these needs. Each embodiment may satisfy one, some, or all of these needs.

BRIEF DESCRIPTION OF THE DRAWINGS (DRAWINGS MIGHT NOT BE DRAWN TO SCALE

FIG. 1 is a schematic, cross-sectional side-view of a reflective wire grid polarizer (WGP) 10, comprising an array of wires 12 on a face $11_F$ of a substrate 11, with channels 15 between adjacent wires 12, each wire 12 including a reflective rib 13 sandwiched between a transparent rib 21 and the substrate 11, in accordance with an embodiment of the present invention.

FIG. 2 is a schematic perspective-view of a WGP 20 in accordance with an embodiment of the present invention.

FIG. 3 is a schematic, cross-sectional side-view of a reflective WGP 30, comprising an array of wires 12 on a face $11_F$ of a substrate 11, with channels 15 between adjacent wires 12, each wire 12 including the following layers in the following order from closest to the substrate 11 to farthest from the substrate 11: a reflective rib 13, a first transparent rib 31, an absorptive rib 34, and a second transparent rib 32, in accordance with an embodiment of the present invention.

FIG. 4 is a schematic, cross-sectional side-view of a reflective WGP 40, similar to other WGPs herein, but further comprising the reflective rib 13 is wider at a distal end $13_D$ farthest from the substrate 11 than at a proximal end $13_P$ closest to the substrate 11, in accordance with an embodiment of the present invention.

FIGS. 5a-b are schematic, cross-sectional side-views of reflective WGPs 50a and 50b, illustrating multiple widths $W_{13}$ of the reflective rib 13, including narrow section(s) 51 and wide section(s) 52, in accordance with embodiments of the present invention.

Figure 7:
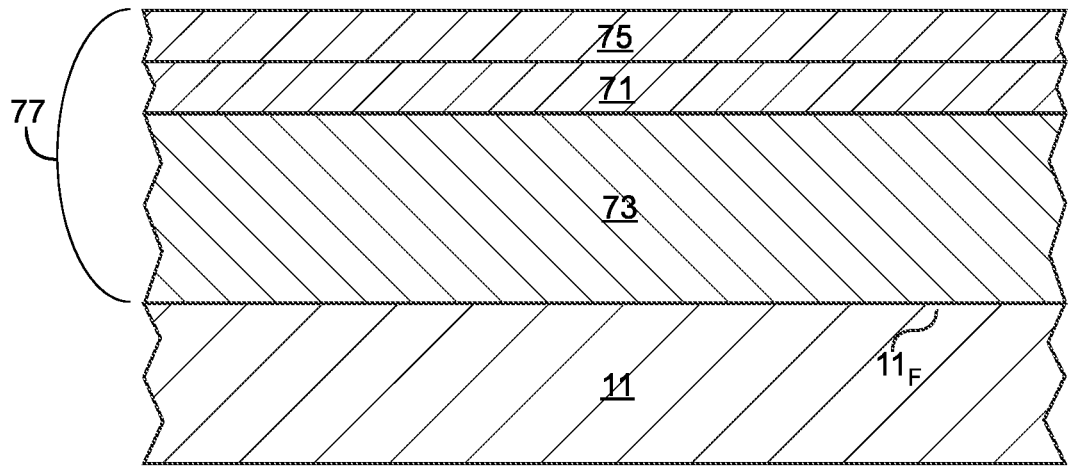
Figure 8:
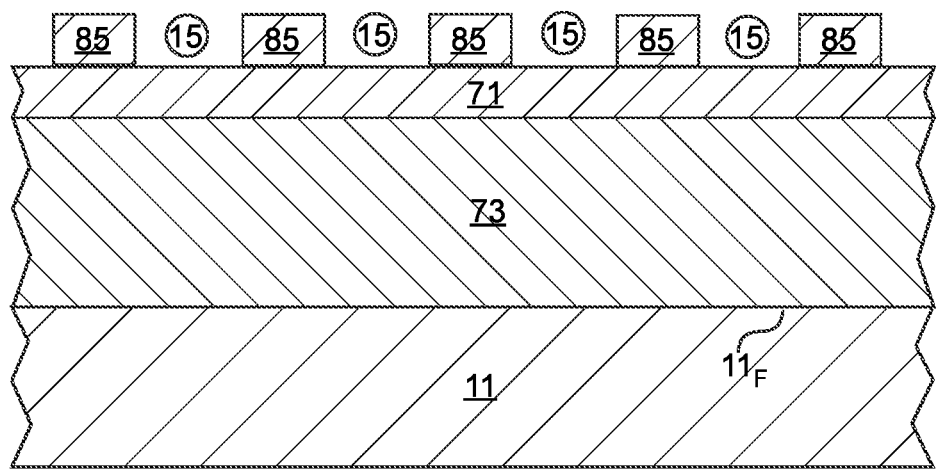

FIGS. 7-8 are schematic, cross-sectional side-views illustrating steps in a method of making a WGP, including providing a substrate 11 with the following thin films 77 on a face $11_F$ of the substrate 11 in the following order from closest to the substrate 11 to farthest from the substrate 11: a reflective thin film 73, a transparent thin film 71, then a resist thin film 75 (FIG. 7); and patterning and etching the resist thin film 75 to form an array of resist ribs 85 (FIG. 8); in accordance with an embodiment of the present invention.

Figure 9:
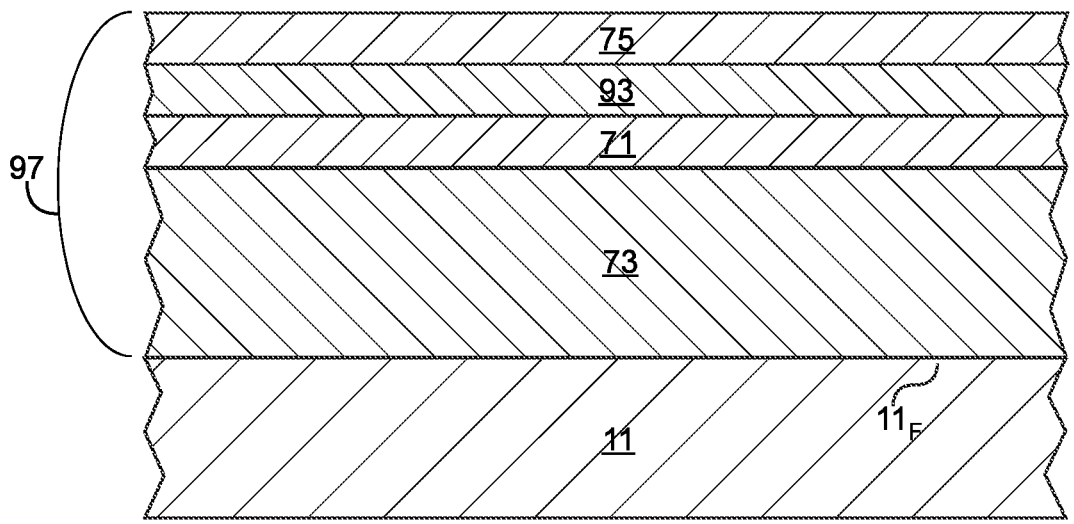
Figure 10:
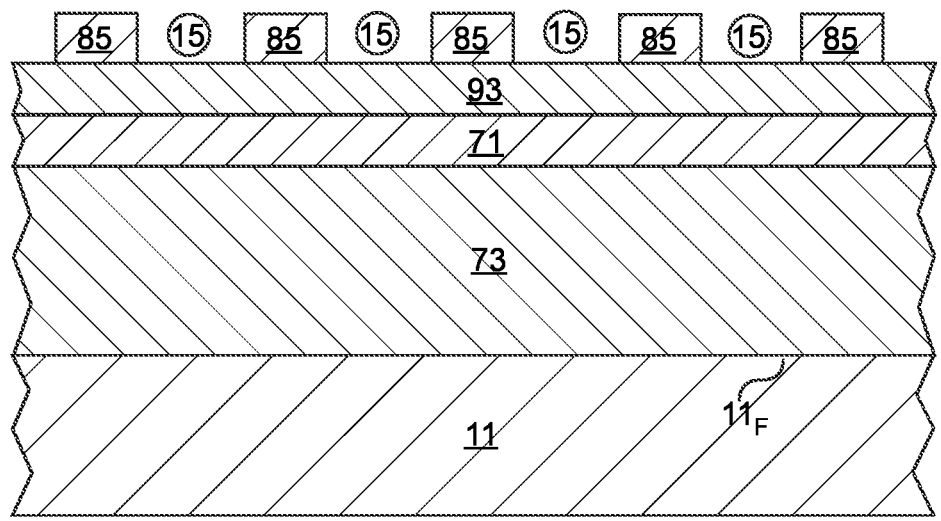
Figure 11:
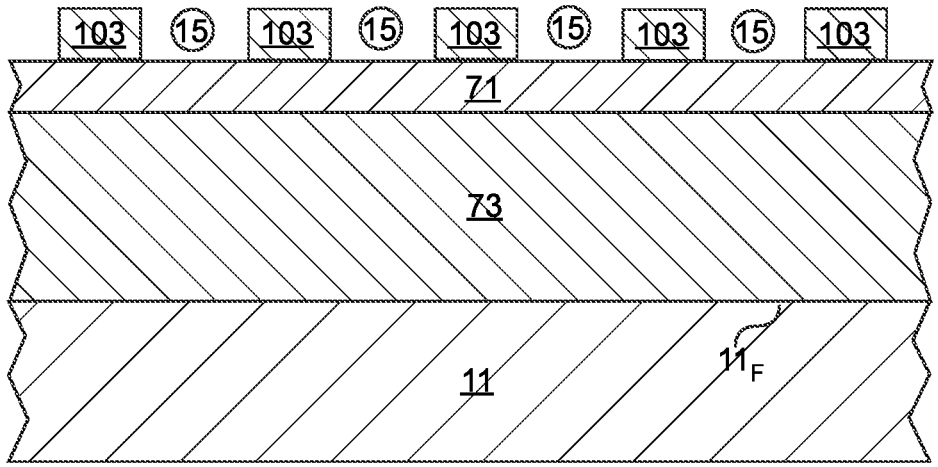

FIGS. 9-11 are schematic, cross-sectional side-views illustrating steps in a method of making a WGP, as an alternative to the steps shown in FIGS. 7-8, including providing a substrate 11 with the following thin films 97 on a face $11_F$ of the substrate 11 in the following order from closest to the substrate 11 to farthest from the substrate 11: a reflective thin film 73, a transparent thin film 71, a second reflective thin film 93, then a resist thin film 75, (FIG. 9); patterning and etching the resist thin film 75 to form an array of resist ribs 85 (FIG. 10); and etching the second reflective thin film 93 to form a top array of reflective ribs 103 (FIG. 11); in accordance with an embodiment of the present invention.

Figure 12:
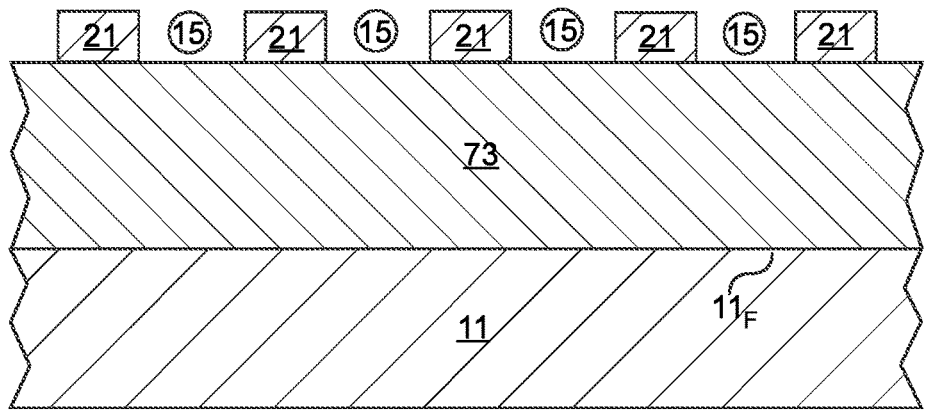

FIG. 12 is a schematic, cross-sectional side-view illustrating a step in a method of making a WGP, which can follow the step illustrated in FIG. 8 or in FIG. 11, including etching the transparent thin film 71 to form an array of transparent ribs 21, in accordance with an embodiment of the present invention.

Figure 13:
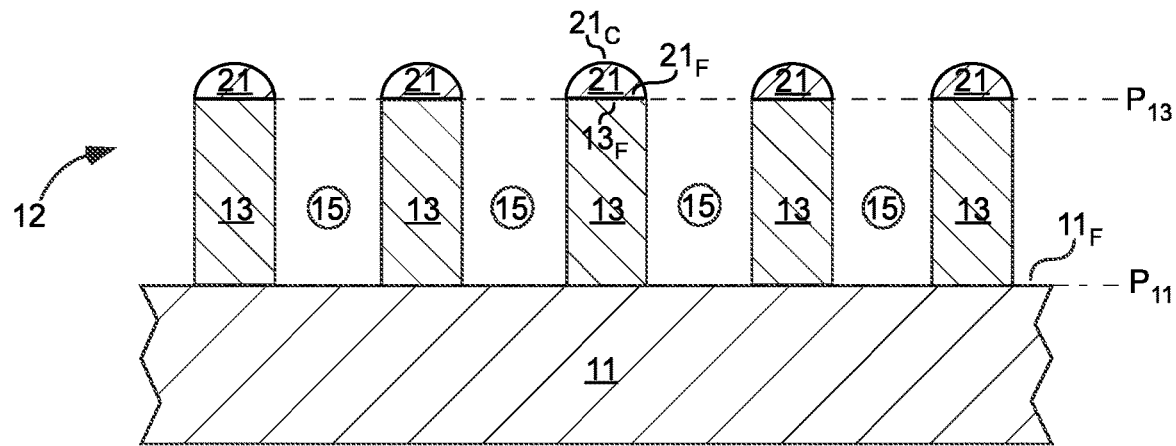

FIG. 13 is a schematic, cross-sectional side-view illustrating a step in a method of making a WGP, including using the transparent ribs 21 as a mask to etch the reflective thin film 73, forming an array of wires 12 with channels 15 between adjacent wires 12, each wire 12 including a reflective rib 13 and a transparent rib 21, and etching the transparent ribs 21, forming a curved side $21_C$ of the transparent ribs 21, while using the transparent ribs 21 as a mask, in accordance with an embodiment of the present invention.

Figure 14:
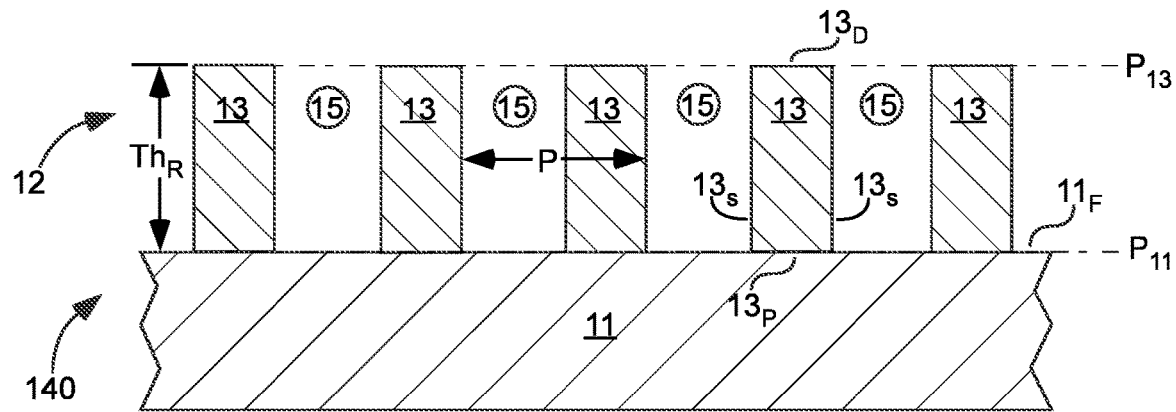

FIG. 14 is a schematic, cross-sectional side-view of a WGP 140 and also illustrating a step in a method of making a WGP, including removing the transparent ribs 21, in accordance with an embodiment of the present invention.

Figure 15:
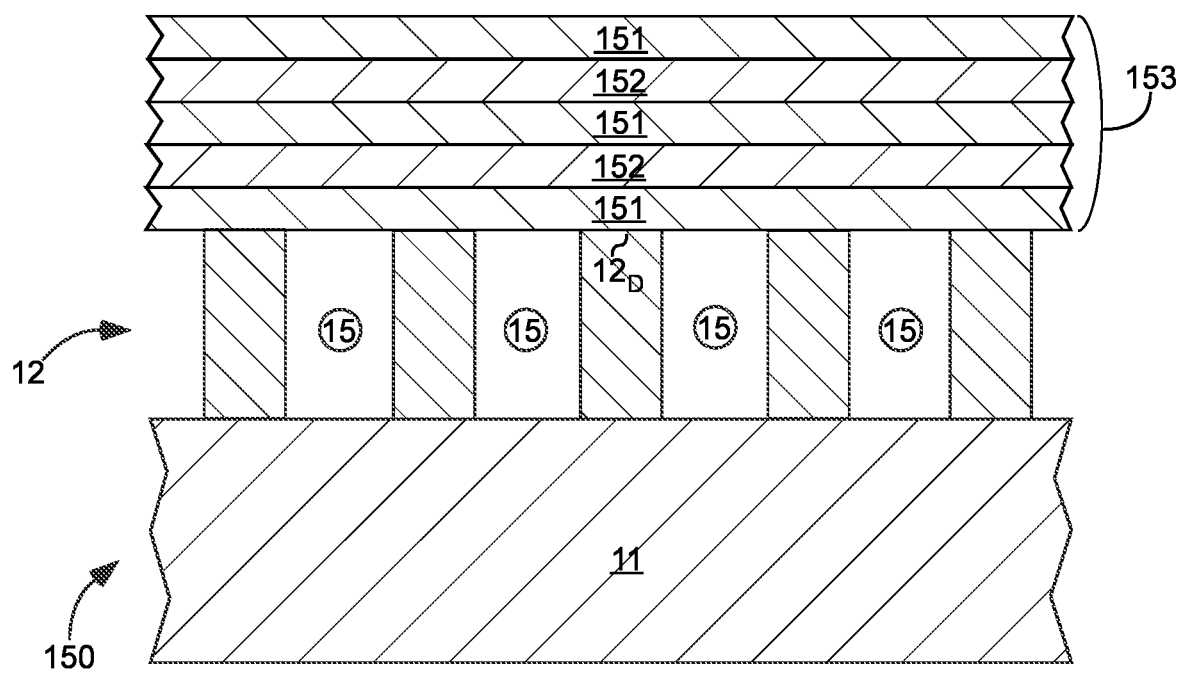

FIG. 15 is a schematic, cross-sectional side-view of a WGP 150, including an array of wires 12 on a substrate 11, with channels 15 between adjacent wires 12; a stack 153 of continuous thin films at a distal end $12_D$ of the wires 12 farthest from the substrate 11, including alternating low index layers 151 and high index layers 152, an odd number of continuous thin films, and the low index layers 151 being outermost thin films in the stack 153, in accordance with embodiments of the present invention.

DEFINITIONS

The following definitions, including plurals of the same, apply throughout this patent application.

As used herein, the term "adjoin" means direct and immediate contact. As used herein, the term "adjacent" includes adjoin, but also includes near or next to with other solid material(s) between the adjacent items.

As used herein, the phrase "consist essentially of", and related phrases such as "consists essentially of" or "consisting essentially of", with regard to wire structure, mean that the wire includes the thin film(s) mentioned, but no other thin film(s) for optical performance. The wire can, however, also include impurities or coatings for protection such as from corrosion or oxidation. Substrate ribs beneath the wires are not included in the wire for the purpose of this definition.

As used herein, the term "elongated" means that a length L of the wires 12 is substantially greater than wire width $W_{12}$ or wire thickness $Th_{12}$ (e.g. L can be ≥10 times, ≥100 times, ≥1000 times, or ≥10,000 times larger than wire width $W_{12}$ and/or wire thickness $Th_{12}$). See FIG. 2.

As used herein, the term "mm" means millimeter(s) and the term "nm" means nanometer(s).

As used herein, the term "parallel" means exactly parallel, or substantially parallel, such that planes or vectors associated with the devices in parallel would intersect with an angle of ≤20°. Intersection of such planes or vectors can be ≤2°, ≤5°, or ≤10° if explicitly so stated.

As used herein, the term "aluminum oxide" includes $Al_2O_3$ and other combinations of aluminum and oxygen, including nonstoichiometric combinations; hafnium oxide includes $HfO_2$ and other combinations of hafnium and oxygen, including nonstoichiometric combinations; silicon dioxide includes $SiO_2$ and other combinations of silicon and oxygen, including nonstoichiometric combinations, and titanium dioxide includes $TiO_2$ and other combinations of titanium and oxygen, including nonstoichiometric combinations.

As used herein, the term "substrate" means a base material, such as for example a glass wafer. Unless specified otherwise in the claims, the term "substrate" also includes any continuous thin film(s) sandwiched between the glass wafer and the wires of the polarizer. The substrate can be thick in an optical sense, meaning substantially thicker than a maximum wavelength of light in the wavelength range of use, if explicitly so stated in the claims. For example, a thickness $Th_{11}$ of the substrate can be ≥0.1 mm, ≥0.35 mm, or ≥0.6 mm.

As used herein, the term "ultraviolet spectrum" means ≥10 nm & <400 nm, the term "visible spectrum" means ≥400 nm & <700 nm, and the term "infrared spectrum" means ≥700 nm & ≤1 mm.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Thus, whether a material is absorptive, reflective, or transparent is dependent on the intended wavelength range of use. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \qquad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

Unless explicitly noted otherwise herein, all temperature-dependent values are such values at 25° C.

DETAILED DESCRIPTION

The following embodiments of reflective wire grid polarizers (WGPs) can be optimized as described herein for performance, including a high transmission of a predominantly-transmitted polarization (e.g. high Tp), minimal transmission of an opposite polarization (e.g. low Ts), high contrast (e.g. high Tp/Ts), low reflection of the primarily transmitted polarization (e.g. low Rp), high reflection of the opposite polarization (e.g. high Rs), or combinations thereof. For most of the WGP characteristics described below, it is the combination of such characteristics that provides the desired benefit, and not the individual characteristic alone.

Low Rp

The WGP characteristics described in the following paragraphs of this Low Rp section and illustrated in FIGS. 1 and 3, particularly combinations of these characteristics, can be particularly useful for reducing reflection of the primarily transmitted polarization (e.g. for low Rp). Embodiments of WGPs with these characteristics have shown a reduction of Rp down to about 10% of what was previously possible.

Figure 1:
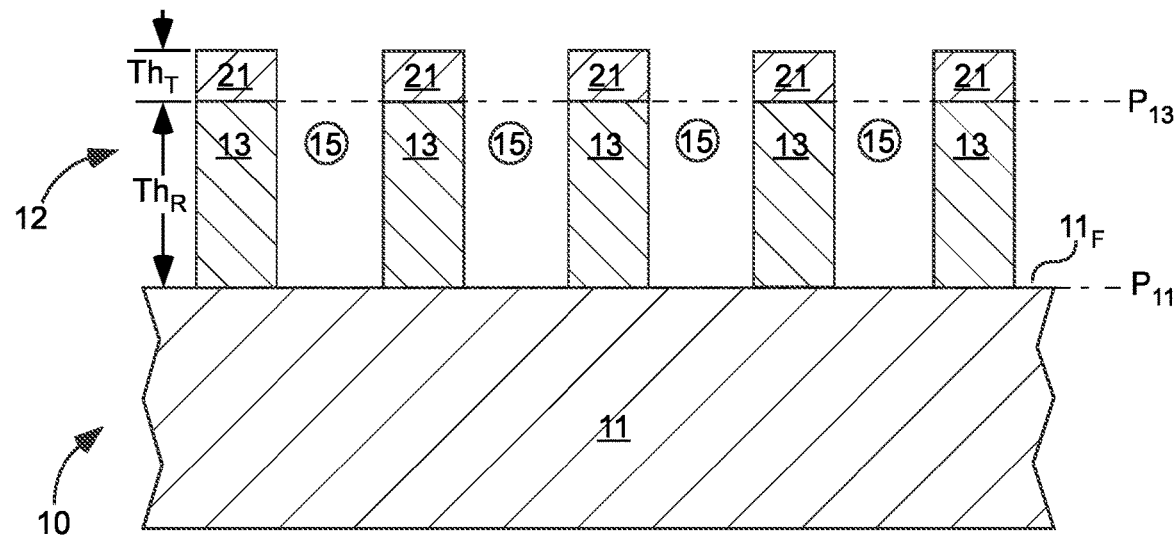

As illustrated in FIG. 1, a reflective WGP 10 is shown comprising an array of wires 12 on a face $11_F$ of a substrate 11, with channels 15 between adjacent wires. The array of wires 12 can be parallel and elongated. Each wire 12 of the array can include a reflective rib 13 and a transparent rib 21. The reflective rib 13 can be sandwiched between the transparent rib 21 and the substrate 11.

The reflective rib 13 can have a thickness ($Th_R$), measured perpendicular to the face $11_F$ of the substrate 11, for improved WGP 10 performance, particularly for reduced Rp. For example, $Th_R$≥90 nm, $Th_R$≥100 nm, $Th_R$≥104 nm, $Th_R$≥107 nm, $Th_R$≥108 nm, or $Th_R$≥114 nm; and $Th_R$≤114 nm, $Th_R$≤116 nm, $Th_R$≤117 nm, $Th_R$≤125 nm, or $Th_R$≤140 nm.

The transparent rib 21 can have a thickness ($Th_T$), measured perpendicular to the face $11_F$ of the substrate 11, for WGP 10 performance, particularly for reduced Rp. For example, $Th_T \geq 4$ nm, $Th_T \geq 7$ nm, $Th_T \geq 10$ nm, $Th_T \geq 11$ nm, $Th_T \geq 12$ nm, or $Th_T \geq 14$ nm; and $Th_T \leq 14$ nm, $Th_T \leq 16$ nm, $Th_T \leq 17$ nm, $Th_T \leq 21$ nm, $Th_T \leq 30$ nm, $Th_T \leq 40$ nm, or $Th_T \leq 50$ nm.

The array of wires 12 can have a duty cycle (DC) for WGP 10 performance, particularly for reduced Rp. For example, $DC \geq 0.35$, $DC \geq 0.39$, $DC \geq 0.42$, or $DC \geq 0.43$; and $DC \leq 0.44$, $DC \leq 0.45$, $DC \leq 0.46$, $DC \leq 0.47$, $DC \leq 0.49$, or $DC \leq 0.55$. DC equals wire width $W_{12}$ divided by pitch P of the array of wires 12, both pitch P and width $W_{12}$ measured at a midpoint between an end of the wires 12 closest to the substrate 11 and an end of the wires 12 farthest from the substrate 11 (see FIG. 2).

As illustrated in FIG. 1, the reflective rib 13 can adjoin the transparent rib 21, can adjoin the substrate 11, or both. Also, as illustrated in FIG. 1, each wire 12 can consist essentially of the reflective rib 13 and the transparent rib 21. A surface of the transparent rib 21 not facing the reflective rib 13 can be exposed to air, covered by a material having a thickness of 15 nm, or both.

Figure 3:
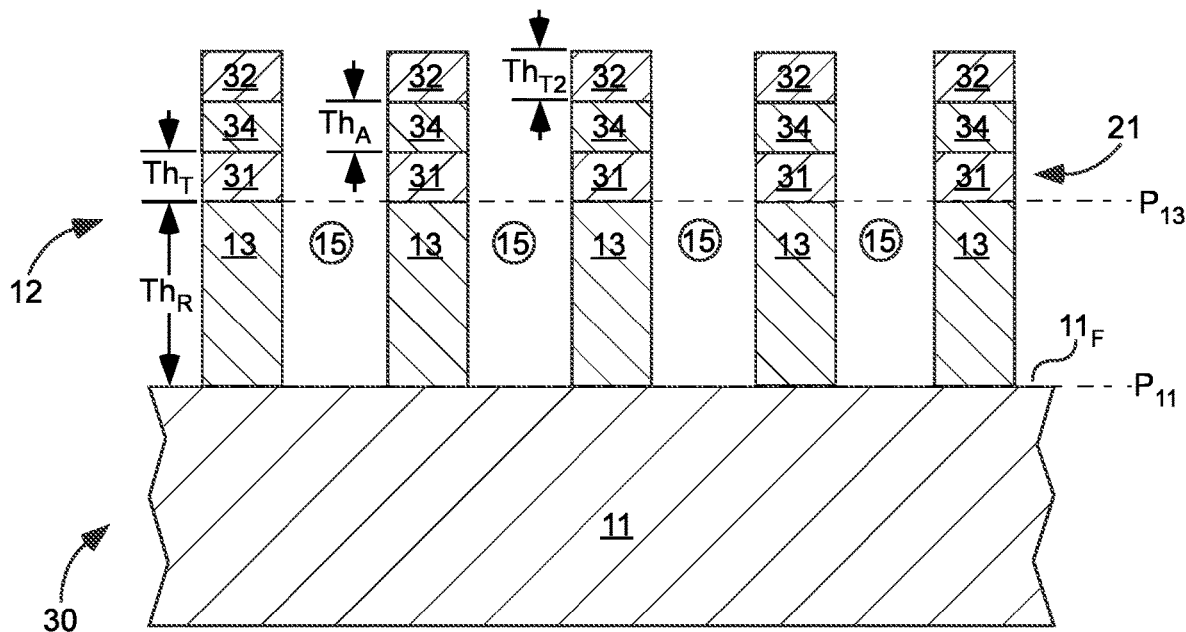

As illustrated in FIG. 3, reflective WGP 30 includes an array of wires 12 on a substrate 11. The wires 12 of WGP 30 can include the following layers in the following order from closest to the substrate 11 to farthest from the substrate 11: a reflective rib 13, a first transparent rib 31, an absorptive rib 34, and a second transparent rib 32. Although an absorptive rib 34 is used in this structure, it is still a reflective WGP and the polarization state not transmitted is predominantly reflected. The absorptive rib 34 can reduce transmission of the predominantly-reflected polarization (e.g. reduce Ts).

The reflective rib 13 can have a thickness ($Th_R$), measured perpendicular to the face $11_F$ of the substrate 11, for WGP 30 performance, particularly for reduced Rp. For example, $Th_R \geq 80$ nm, $Th_R \geq 95$ nm, $Th_R \geq 105$ nm, $Th_R \geq 114$ nm, $Th_R \geq 115$ nm, or $Th_R \geq 123$ nm; and $Th_R \leq 123$ nm, $Th_R \leq 135$ nm, $Th_R \leq 136$ nm, $Th_R \leq 155$ nm, or $Th_R \leq 170$ nm.

The first transparent rib 31 can have a thickness ($Th_T$), measured perpendicular to the face $11_F$ of the substrate 11, for WGP 30 performance, particularly for reduced Rp. For example, $Th_T \geq 0.05$ nm, $Th_T \geq 0.1$ nm, $Th_T \geq 0.5$ nm, or $Th_T \geq 1$ nm; and $Th_T \leq 1$ nm, $Th_T \leq 2$ nm, $Th_T \leq 3$ nm, $Th_T \leq 5$ nm, or $Th_T \leq 10$ nm. The first transparent rib 31 can be helpful for WGP performance. The first transparent rib 31 can also provide a barrier between the reflective rib 13 and the absorptive rib 34, to avoid migration of atoms from the absorptive rib 34 from combining with atoms in the reflective rib 13.

The absorptive rib 34 can have a thickness ($Th_A$), measured perpendicular to the face $11_F$ of the substrate 11, for WGP 30 performance, particularly for reduced Rp. For example, $Th_A \geq 0.1$ nm, $Th_A \geq 0.5$ nm, $Th_A \geq 0.9$ nm, $Th_A \geq 1$ nm, $Th_A \geq 1.5$ nm, or $Th_A \geq 1.6$ nm; and $Th_A \leq 1.6$ nm, $Th_A \leq 2$ nm, $Th_A \leq 3$ nm, $Th_A \leq 4$ nm, $Th_A \leq 8$ nm, or $Th_A \leq 15$ nm.

The second transparent rib 32 can have a thickness ($Th_{T2}$), measured perpendicular to the face $11_F$ of the substrate 11, for WGP 30 performance, particularly for reduced Rp. For example, $Th_{T2} \geq 3$ nm, $Th_{T2} \geq 6$ nm, $Th_{T2} \geq 7$ nm, $Th_{T2} \geq 8$ nm, $Th_{T2} \geq 10$ nm, or $Th_{T2} \geq 13$ nm; and $Th_{T2} \leq 15$ nm, $Th_{T2} \leq 19$ nm, $Th_{T2} \leq 20$ nm, or $Th_{T2} \leq 30$ nm.

The array of wires 12 can have a duty cycle (DC) for WGP 30 performance, particularly for reduced Rp. For example, $DC \geq 0.35$, $DC \geq 0.41$, $DC \geq 0.43$, or $DC \geq 0.44$; and $DC \leq 0.44$, $DC \leq 0.45$, $DC \leq 0.46$, $DC \leq 0.47$, $DC \leq 0.48$, or $DC \leq 0.55$. DC equals wire width $W_{12}$ divided by pitch P of the array of wires 12, both pitch P and width $W_{12}$ measured at a midpoint between an end of the wires 12 closest to the substrate 11 and an end of the wires 12 farthest from the substrate 11 (see FIG. 2).

As illustrated in FIG. 3, the reflective rib 13 can adjoin the first transparent rib 31, the substrate 11, or both. The absorptive rib 34 can adjoin the first transparent rib 31, the second transparent rib 32, or both. Also, as illustrated in FIG. 3, each wire 12 can consist essentially of the reflective rib 13, the first transparent rib 31, the absorptive rib 34, and the second transparent rib 32.

A shape of each wire 12 can be adjusted for WGP performance, such as increased Tp, to facilitate manufacturing, or both. For example, each wire 12 of WGPs 10 or 30 can further comprise taper angle A of sidewalls $13_S$ of the reflective rib 13, multiple widths $W_{13}$ of the reflective rib 13 including narrow section(s) 51 and wide section(s) 52, the reflective rib 13 having a flat side $13_F$, the transparent rib 21 having a curved side $21_C$, the second transparent rib 32 having a curved side $32_C$, high aspect ratio (AR), air-filled channels, or combinations thereof, as described with other embodiments herein. The rib thicknesses and wire duty cycles of WGPs 10 or 30 can be applied to any of the other WGP embodiments described herein. WGPs 10 and 30 can be useful for WGP performance, particularly low Rp.

WGP with Reflective Rib Taper Angle

Figure 4:
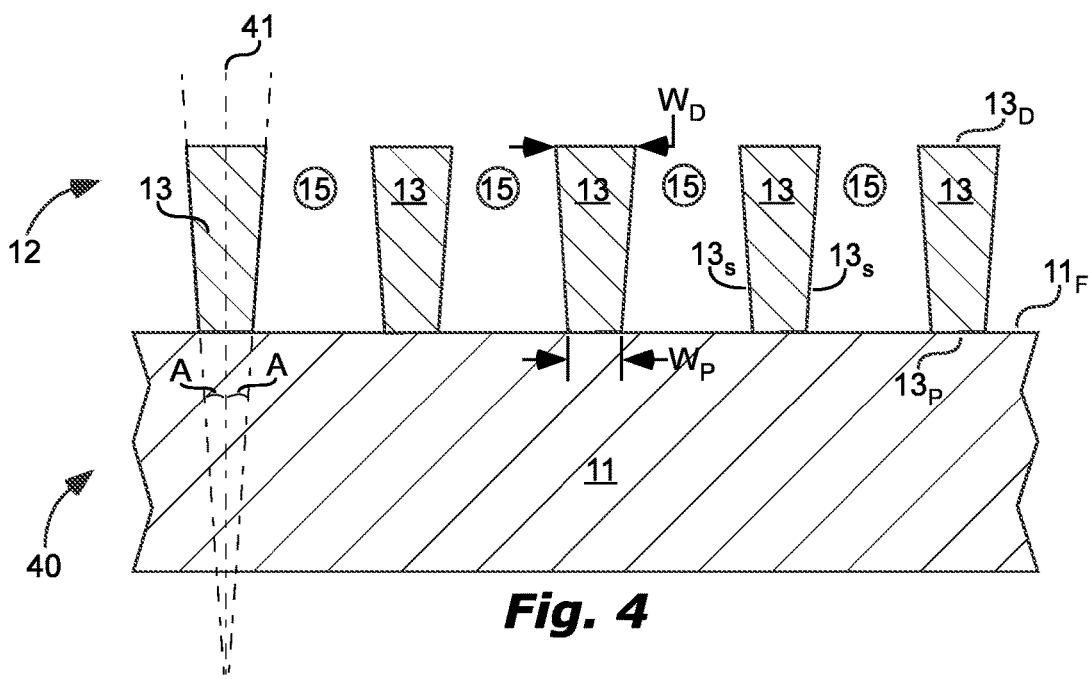

As illustrated in FIG. 4, reflective WGP 40 can include an array of wires 12 on a face $11_F$ of a substrate 11, with channels 15 between adjacent wires. Each wire 12 can include a reflective rib 13. The reflective rib 13 can be wider at a distal end $13_D$ farthest from the substrate 11 than at a proximal end $13_P$ closest to the substrate 11. Thus, the rib can be shaped for WGP performance, such as to increase Tp, or to facilitate manufacturing.

A taper angle A of sidewalls $13_S$ of the reflective rib 13, relative to a plane 41 perpendicular to the face $11_F$ of a substrate 11 and parallel with the array of wires, can include one or more of the following values: taper angle$\geq 0.3°$, taper angle$\geq 0.5°$, taper angle$\geq 1°$, taper angle$\geq 1.2°$, taper angle$\geq 1.5°$, taper angle$\geq 2°$, or taper angle$\geq 3°$; and taper angle$\leq 3°$, taper angle$\leq 4°$, taper angle$\leq 5°$, taper angle$\leq 6°$, or taper angle$\leq 10°$.

Each wire 12 of WGP 40 can further comprise thickness $Th_R$ of the reflective rib 13; transparent rib(s) 21, 31, 32; thicknesses $Th_T$ and $Th_{T2}$ of the transparent ribs 21, 31, and 32; an absorptive rib 34; thickness $Th_A$ of the absorptive rib 34; the reflective rib 13 having a flat side $13_F$; the transparent rib 21 having a curved side $21_C$; the second transparent rib 32 having a curved side $32_C$; high aspect ratio (AR); air-filled channels; or combinations thereof, as described with other embodiments herein. The shape of the reflective rib 13 of WGP 40 can be applied to any of the other WGP embodiments described herein. WGP 40 can be useful for WGP performance, particularly low Rp.

WGP with Multiple Width Reflective Rib

Figure 5A:
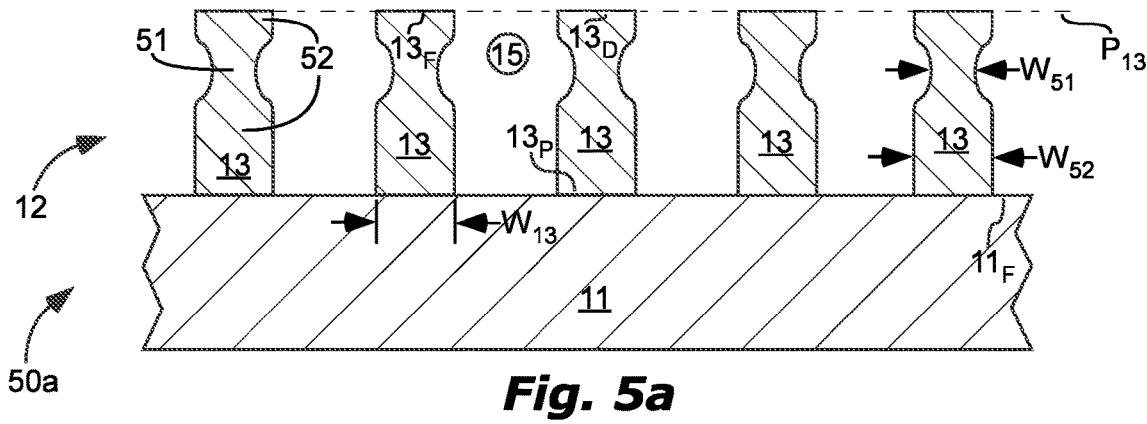
Figure 5B:
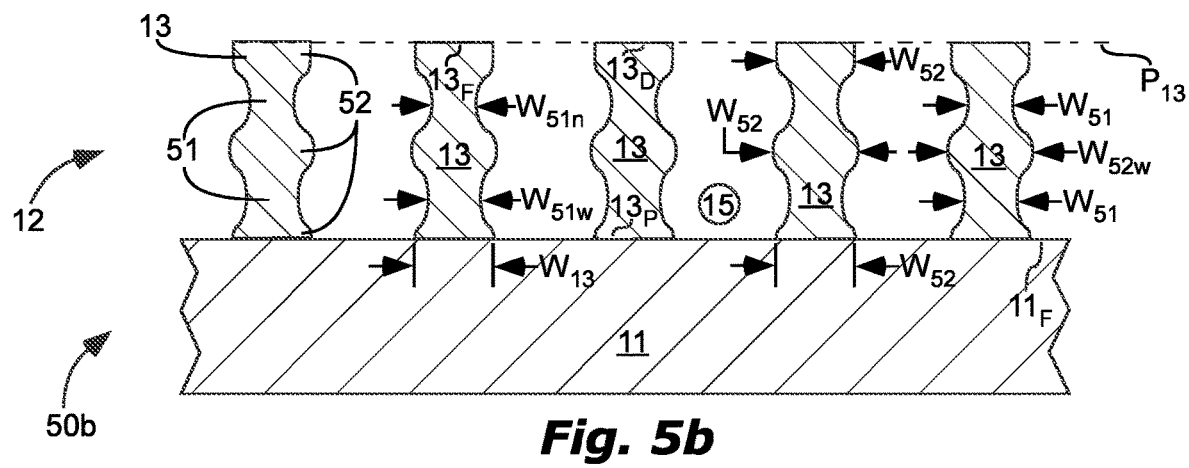

As illustrated in FIGS. 5a and 5b, reflective WGPs 50a and 50b can include an array of wires 12 on a face $11_F$ of a substrate 11, with channels 15 between adjacent wires. Each wire 12 can include a reflective rib 13. The reflective rib 13 can have multiple widths $W_{13}$, including narrow section(s) 51 and wide section(s) 52. The wide sections 52 and the narrow sections 51 can alternate.

As illustrated in FIG. 5a, the reflective rib 13 can including a single narrow section 51 and two wide sections 52. Following are example relationships of these widths for WGP performance. A width ($W_{51}$) of the narrow section 51 divided by a width ($W_{52}$) of the wide section 52 can be within the following range: $W_{51}/W_{52} \geq 0.40$, $W_{51}/W_{52} \geq 0.48$, $W_{51}/W_{52} \geq 0.55$, or $W_{51}/W_{52} \geq 0.65$; and $W_{51}/W_{52} \leq 0.65$, $W_{51}/W_{52} \leq 0.75$, or $W_{51}/W_{52} \leq 0.85$. Although not shown in FIG. 5a, the reflective rib 13 can including a single narrow section 51 and a single wide section 52.

As illustrated in FIG. 5b, the reflective rib 13 can including two narrow sections 51 and three wide sections 52. The two narrow sections 51 can be separated from each other by one of the three wide sections 52. Two of the three wide sections 52, not between the two narrow sections 51, can be located at outer ends (proximal end $13_P$ and distal end $13_D$) of the reflective rib 13. The WGP can include more narrow sections 51 and more wide sections 52 than is illustrated in FIG. 5b.

Following are example relationships of these widths for WGP 50b performance. A width ($W_{51w}$) of a wider of the narrow sections 51 divided by a width ($W_{52w}$) of a widest of the wide sections 52 can be within the following range: $W_{51w}/W_{52w} \geq 0.40$, $W_{51w}/W_{52w} \geq 0.55$, or $W_{51w}/W_{52w} \geq 0.65$; and $W_{51w}/W_{52w} \leq 0.65$, $W_{51w}/W_{52w} \leq 0.75$, or $W_{51w}/W_{52w} \leq 0.85$. A width ($W_{51n}$) of a narrower of the narrow sections 51 divided by a width ($W_{52w}$) of a widest of the wide sections 52 can be within the following range: $W_{51n}/W_{52w} \geq 0.40$, $W_{51n}/W_{52w} \geq 0.48$, $W_{51n}/W_{52w} \geq 0.58$, or $W_{51n}/W_{52w} \geq 0.68$; and $W_{51n}/W_{52w} \leq 0.68$, $W_{51n}/W_{52w} \leq 0.75$, or $W_{51n}/W_{52w} \leq 0.85$.

The following relationships of widths ($W_{51}$) of the narrow sections can be useful for increasing transmission of the predominantly-transmitted polarization (e.g. increasing Tp), decreasing transmission of the opposite polarization (e.g. decreasing Ts), and improving durability of WGP 50b: $W_{51n}/W_{51w} \geq 0.67$, $W_{51n}/W_{51w} \geq 0.77$, or $W_{51n}/W_{51w} \geq 0.85$; and $W_{51n}/W_{51w} \leq 0.85$, $W_{51n}/W_{51w} \leq 0.90$, or $W_{51n}/W_{51w} \leq 0.97$.

The narrow section 51 nearest the distal end $13_D$ of WGP 50a or WGP 50b can increase transmission of the predominantly-transmitted polarization (e.g. increase Tp). The second wide section 52 from the distal end $13_D$ of WGP 50a or WGP 50b can improve durability of the wires 12. The narrow section 51 nearest the proximal end $13_P$ of WGP 50b can improve performance at lower light wavelengths.

The multiple widths $W_{13}$ described above can be accomplished by injecting more nitrogen gas with the etch chemistry during etch of the wider section(s) and less nitrogen gas during etch of the narrower section(s). In theory, the nitrogen combines with chemistry of the resist to form a protective layer on sidewalls of the aluminum.

Each wire 12 of WGPs 50a or 50b can further comprise thickness $Th_R$ of the reflective rib 13; transparent rib(s) 21, 31, 32; thicknesses $Th_T$ and $Th_{T2}$ of the transparent ribs 21, 31, and 32; an absorptive rib 34; thickness $Th_A$ of the absorptive rib 34; the reflective rib 13 having a flat side $13_F$; the transparent rib 21 having a curved side $21_C$; the second transparent rib 32 having a curved side $32_C$; high aspect ratio (AR); air-filled channels; or combinations thereof, as described with other embodiments herein. The shape of the reflective rib 13 of WGPs 50a or 50b can be applied to any of the other WGP embodiments described herein. WGPs 50a or 50b can be useful for WGP performance, particularly high Tp and low Ts.

WGP with a Flat Reflective Rib, a Rounded Transparent Cap, or Both

Typically, a change in WGP structure to increase Tp will increase Ts, and a change in WGP structure to decrease Ts will decrease Tp. WGP designers normally must choose between increasing Tp or decreasing Ts. Therefore, some WGPs are designed for high Tp and others designed for low Ts. The WGP characteristics of this section, particularly combinations of these characteristics, and illustrated in FIGS. 6a and 6b, have increased Tp and decreased Ts.

As illustrated in FIGS. 1, 3, 5a-6b, and 14, a distal end $13_D$ (farthest from the substrate 11) of the reflective rib 13 can include a flat side $13_F$. The flat side $13_F$ can face the transparent rib 21 (if used). The flat side $13_F$ of the reflective rib 13 can be parallel to the face $11_F$ of the substrate 11 (i.e. plane $P_{13}$ of the flat side $13_F$ of the reflective rib 13 is parallel to the plane $P_{11}$ of the face $11_F$ of the substrate 11). Such flat side $13_F$ can be useful for WGP performance, particularly for high Tp and low Ts, and can result from the method of making as described below. The transparent rib 21 can have a flat side $21_F$ facing the flat side $13_F$ of the reflective rib 13. The second transparent rib 32 can have a flat side $32_F$ facing the flat side $13_F$ of the reflective rib 13. The flat side $13_F$ of the reflective rib 13, the flat side $21_F$ of the transparent rib 21, the flat side $32_F$ of the second transparent rib 32, or combinations thereof, can apply to any embodiment described herein.

Figure 6A:
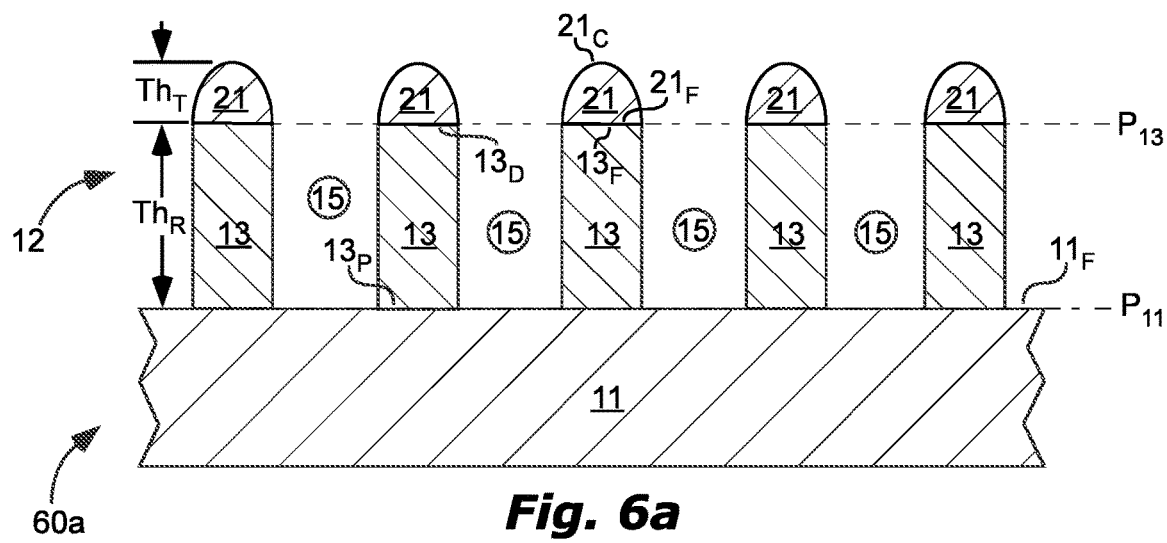
FIG. 6a is a schematic, cross-sectional side-view of reflective WGP 60a, similar to WGP 10, but further comprising the transparent rib 21 having a curved side $21_C$, in accordance with an embodiment of the present invention.
Figure 6B:
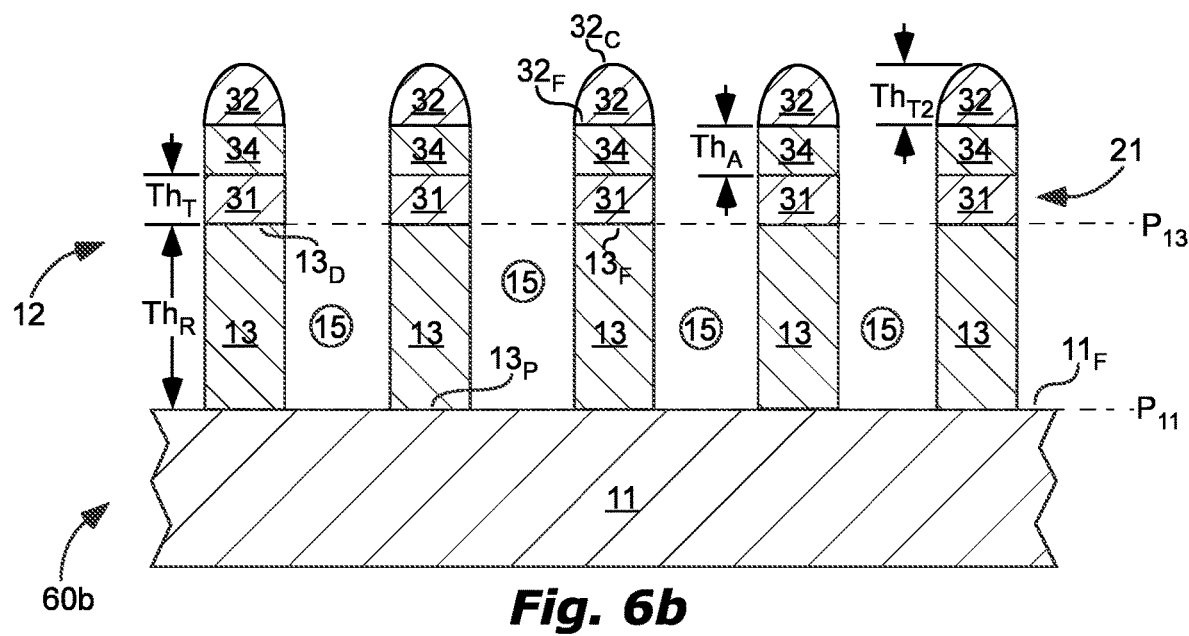
FIG. 6b is a schematic, cross-sectional side-view of reflective WGP 60b, similar to WGP 30, but further comprising the second transparent rib 32 having a curved side $32_C$, in accordance with an embodiment of the present invention.

As illustrated in FIG. 6a, for WGP performance, the transparent rib 21 can have a curved side $21_C$ opposite of its flat side $21_F$. As illustrated in FIG. 6b, for WGP performance, the second transparent rib 32 can have a curved side $32_C$ opposite of its flat side $32_F$. The curved side $21_C$ or $32_C$ can be shaped for WGP performance. For example, the curved side $21_C$ or $32_C$ can have a half elliptical shape. A major axis of the half elliptical shape can extend perpendicular to the face $11_F$ of the substrate 11, as illustrated in FIG. 6a, or parallel to the face $11_F$ of the substrate 11, as illustrated in FIG. 13. Examples of eccentricity of the half elliptical shape include: eccentricity $\geq 0.5$, eccentricity $\geq 0.6$, or eccentricity $\geq 0.7$; and eccentricity $\leq 0.8$, eccentricity $\leq 0.9$, or eccentricity $\leq 0.95$.

Each wire 12 of WGPs 60a or 60b can further comprise thickness $Th_R$ of the reflective rib 13; thicknesses $Th_T$ and $Th_{T2}$ of the transparent ribs 21, 31, and 32; thickness $Th_A$ of the absorptive rib 34; taper angle A of sidewalls $13_s$ of the reflective rib 13; multiple widths $W_{13}$ of the reflective rib 13 including narrow section(s) 51 and wide section(s) 52; high aspect ratio (AR); air-filled channels; or combinations thereof, as described with other embodiments herein. The reflective rib 13 having a flat side $13_F$, the transparent rib 21 having a curved side $21_C$, and the second transparent rib 32 having a curved side $32_C$, of WGPs 60a and 60b, can be applied to other WGP embodiments described herein. WGPs 60a and 60b can be useful for WGP performance, particularly high Tp and low Ts.

Reflective WGP with High Aspect Ratio

As illustrated in FIG. 14, WGP 140 can include an array of wires 12 similar to those described above. Each wire 12 can consist essentially of the reflective rib 13. The reflective rib 13 can have a proximal end $13_P$ facing the substrate 11 and a distal end $13_D$ opposite of the proximal end and farthest from the substrate 11. The distal end $13_D$ can be flat and parallel to the face $11_F$ of the substrate 11.

This embodiment can be manufactured as described below in the method section with the flat distal end $13_D$, high aspect ratio (AR), and unfilled channels 15. Prior manufacturing methods were unable to achieve all three of these, and thus the prior WGPs had reduced performance. Channels 15 of WGP 140 can be air-filled. These channels 15 can be air-filled from the proximal end $13_P$ to the distal end $13_D$ of the wires 12. Sidewalls $13_s$ of the wires 12, across the distal end $13_D$ of the wires 12, or both can be exposed to air and/or covered with a conformal coating having a thickness of $\leq 1$ nm, $\leq 5$ nm, $\leq 10$ nm, $\leq 15$ nm, $\leq 20$ nm. The condition of the prior sentence can be along part of the sidewalls $13_S$ or along the full sidewalls $13_S$ from the proximal end $13_P$ to the distal end $13_D$ of the wires 12. Following are example aspect ratios for WGP performance, and as made possible by the method described below: AR≥1.3, AR≥1.6, AR≥1.8, AR≥2.0, or AR≥2.5; and AR≤10. Aspect ratio (AR)=$Th_R$/P, where $Th_R$ equals a thickness of the reflective rib 13 measured perpendicular to the face $11_F$ of the substrate 11, and P equals a pitch of the array of wires.

The high aspect ratio and air-filled channels of WGP 140 can be applied to other WGP embodiments described herein. WGP 140 can be useful for WGP performance, particularly high Tp and low Ts.

Alternating Low and High Index Layers

As illustrated in FIG. 15, WGP 150 can include an array of wires 12 on a substrate, with channels between adjacent wires. The array of wires 12 can be similar to those described above. Thus, the design of WGP 150 can be combined with any other WGP embodiments described herein. Alternatively, the array of wires 12 can be different than those described above and can primarily absorb or reflect one polarization.

WGP 150 can also include a stack 153 of continuous thin films at a distal end $12_D$ of the wires 12 farthest from the substrate 11. The stack 153 of continuous thin films can include alternating low index layers 151 and high index layers 152. For WGP 150 performance, the stack 153 of continuous thin films can include an odd number of continuous thin films with the low index layers 151 being outermost thin films in the stack. For example, the stack 153 of continuous thin films can include 3 thin films, 5 thin films, 7 thin films or more.

Example refractive index ($n_L$) and extinction coefficient ($k_L$) of the low index layers, across the ultraviolet spectrum, across the visible spectrum, across the infrared spectrum, or combinations thereof, include: $n_L$≤1.4, $n_L$≤1.5, $n_L$≤1.6, or $n_L$≤1.7; and $k_L$≤0.001, $k_L$≤0.01, or $k_L$≤0.1. Example refractive index ($n_H$) and extinction coefficient ($k_H$) of the high index layers, across the ultraviolet spectrum, across the visible spectrum, across the infrared spectrum, or combinations thereof, include: $n_H$≥2.0, $n_H$≥2.1, $n_H$≥2.2, $n_H$≥2.3, or $n_H$≥2.4; and $k_H$≤0.001, $k_H$≤0.01, or $k_H$≤0.1.

The low index layers 151 can comprise silicon dioxide, such as for example ≥80 mass percent, ≥90 mass percent, ≥95 mass percent, or ≥99 mass percent silicon dioxide. The high index layers 152 can comprise niobium pentoxide, such as for example ≥80 mass percent, ≥90 mass percent, ≥95 mass percent, or ≥99 mass percent niobium pentoxide.

General Information for All Embodiments

A choice among the above embodiments can depend on overall WGP design and can relate to materials used and thicknesses of the layers. Any of the above WGP characteristics can be merged in any combination. Such combinations, including merging characteristics for low Rp with characteristics for high Tp/low Ts, can result in optimal overall WGP performance. Each WGP design for each specific application may have its own unique combination of such characteristics. The following characteristics, however, are particularly applicable to any of the WGP embodiments described herein.

The inventions described herein can be optimized for WGP performance. The embodiments of FIGS. 1, 3, and 4 can be particularly helpful for low Rp. The embodiments of FIGS. 5a-6b and 14 can be particularly helpful for high Tp and low Ts. Examples of performance for the WGPs described herein include: Rp≤0.05%, Rp≤0.1%, Rp≤0.2%, or Rp≤0.5%; Rs≥80%, Rs≥85%, Rs≥90%, or Rs≥95%; Tp≥85%, Tp≥88%, or Tp≥91%; Ts≤0.01, Ts≤0.04, Ts≤0.08, or Ts≤0.12; each at a wavelength of 450 nm, 550 nm, or 650 nm, or across a wavelength range from 450 nm through 700 nm. Rp is a percent reflection and Tp is a percent transmission of a primarily transmitted polarization. Rs is a percent reflection and Ts is a percent transmission of a primarily reflected polarization.

Figure 2:
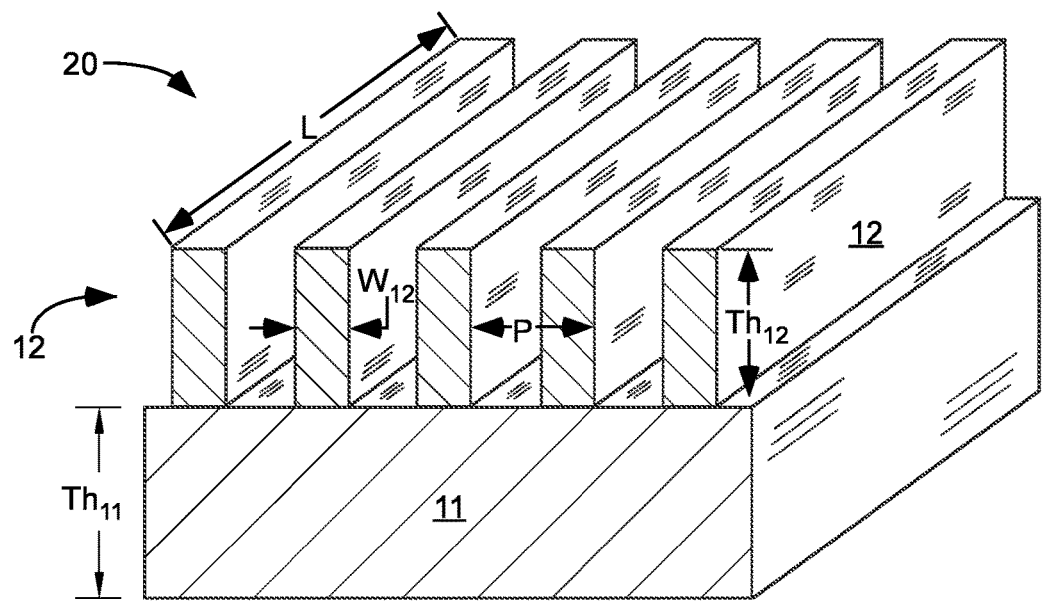

FIG. 2 is a schematic perspective-view of WGP 20, illustrating a relationship between pitch P of the array of wires 12, wire width $W_{12}$, wire thickness $Th_{12}$, and wire length L. These relationships and this structure can be applied to any of the embodiments described herein.

The transparent ribs 21, 31, and 32 can have k≤0.1; the absorptive rib 34 can have k>0.1 and R≤0.6; and the reflective rib 13 can have k>0.1 and R>0.6; each in a specified wavelength range, such as for example across the visible spectrum, across the infrared spectrum, across the ultraviolet spectrum, or combinations thereof, as further described in the definitions section.

For WGP performance of any WGP embodiments described herein, the transparent ribs 21, 31, and 32 can have a relatively large real part of the refractive index (n), a relatively low extinction coefficient (k), or both. For example, across a wavelength range from 400 nm through 700 nm, n≥1.7, n≥2.0, n≥2.1, or n≥2.3; and k≤0.1, k≤0.01, or k≤0.001, independently, for each of the transparent ribs 21, 31, and 32. The n and k values of this paragraph, combined with other WGP characteristics described herein, can be particularly useful for low Rp, high Tp, low Ts, or combinations thereof.

Following are example materials for layers of the wires 12, for any of the WGP embodiments described herein. The transparent rib 21, the first transparent rib 31, the second transparent rib 32, or combinations thereof can comprise silicon dioxide, titanium dioxide, aluminum oxide, hafnium oxide, or combinations thereof. The absorptive rib 34 can include silicon, germanium, or both. The reflective rib 13 can comprise aluminum. Different materials may be selected for different WGP designs, depending on whether improving Tp, Ts, Tp/Ts, Rp, or Rs is the primary objective.

Method

A method of making a WGP can comprise some or all of the following steps, which can be performed in the following order or other order if so specified. Some of the steps can be performed simultaneously unless explicitly noted otherwise in the claims. There may be additional steps not described below. These additional steps may be before, between, or after those described. Components of the WGP, and the WGP itself, can have properties as described above.

The method can comprise:

(A1) Step A1 can include providing a substrate 11 with the following thin films 77 on a face $11_F$ of the substrate 11 in the following order from closest to the substrate 11 to farthest from the substrate 11: a reflective thin film 73, a transparent thin film 71, then a resist thin film 75 (FIG. 7). There may be additional thin films not listed. Step A1 can also include patterning and etching the resist thin film 75 to form an array of resist ribs 85 with channels 15 between adjacent resist ribs 85 (FIG. 8).

(A2) An alternative to step A1 is illustrated in FIGS. 9-11 and is described in this step A2. Step A2 can include providing a substrate 11 with the following thin films 97 on a face $11_F$ of the substrate 11 in the following order from closest to the substrate 11 to farthest from the substrate 11: a reflective thin film 73, a transparent thin film 71, a second reflective thin film 93, then a resist thin film 75, (FIG. 9). There may be additional thin films not listed. Step A2 can also include patterning and etching the resist thin film 75 to form an array of resist ribs 85 with channels 15 between adjacent resist ribs 85 (FIG. 10). Step A2 can further include etching the second reflective thin film 93 to form a top array of reflective ribs 103 with channels 15 between adjacent reflective ribs 103 of the top array (FIG. 11). The array of resist ribs 85 can be used as a mask to etch the second reflective thin film 93.

(B) Step B can follow steps A1 or steps A2. Step B can include etching the transparent thin film 71 to form an array of transparent ribs 21 with channels 15 between adjacent transparent ribs 21. The array of resist ribs 85 (if following step A1) or the top array of reflective ribs 103 (if following step A2) can be used as a mask to etch the transparent thin film 71. See FIG. 12.

(C) Step C can follow step B. Step C can include using the transparent ribs 21 as a mask to etch the reflective thin film 73, forming an array of wires 12 with channels 15 between adjacent wires 12, each wire 12 including a reflective rib 13 and a transparent rib 21, and etching the transparent ribs 21, forming a curved side $21_C$ of the transparent ribs 21, while using the transparent ribs 21 as a mask. See FIG. 13. Using argon during a later part of the etch of the transparent ribs 21 can help form the curved side $21_C$ of the transparent rib 21.

(D) Step D can follow step C. Step D can include removing the transparent ribs 21. Chlorine can be used to remove any remaining resist ribs 85. Boron trichloride, fluorine, chlorine, or combinations thereof can be used for removal of the transparent rib 21. The transparent rib 21, particularly with the curved side $21_C$, can improve performance at certain angles of incidence, but performance at other angles can be better with the transparent rib 21 removed.

The reflective thin film 73 and the second reflective thin film 93 can have a same material composition with respect to each other. This can allow easier etching of the reflective thin film 73. For example, the reflective thin film 73 and the second reflective thin film 93 can both comprise aluminum, such as ≥10% Al, ≥50% Al, ≥80% Al, or ≥95% Al.

What is claimed is:

1. A reflective wire grid polarizer (WGP) comprising:
an array of wires on a face of a substrate, with channels between adjacent wires;
each wire consists essentially of a reflective rib; and
the reflective rib being wider at a distal end farthest from the substrate than at a proximal end closest to the substrate, a taper angle of sidewalls of the reflective rib, relative to a plane perpendicular to the face of a substrate and parallel with the array of wires, is within the following range: 2°≤taper angle≤4°.

2. The WGP of claim 1, wherein:
the array of wires having an aspect ratio (AR) of ≥1.8, where AR=$Th_R$/P, $Th_R$ is a thickness of the wires measured perpendicular to the face of the substrate, and P is a pitch of the array of wires.

3. The WGP of Tim 1, wherein:
the channels are air-filled; and
the reflective rib having a proximal end facing the substrate and a distal end opposite of the proximal end and farthest from the substrate, the distal end being flat and parallel to the face of the substrate.

4. The WGP of claim 3, wherein the channels are air-filled from the proximal end to the distal end of the wires.

5. A reflective wire grid polarizer (WGP) comprising:
an array of wires on a face of a substrate, with channels between adjacent wires;
each wire including a reflective rib;
the reflective rib having multiple widths, including two narrow sections and three wide sections, the two narrow sections separated from each other by one of the three wide sections;
a width ($W_{51w}$) of a wider of the narrow sections divided by a width ($W_{52w}$) of a widest of the wide sections is within the following range: 0.55≤$W_{51w}$/$W_{52w}$≤0.75; and
a width ($W_{51n}$) of a narrower of the narrow sections divided by the width ($W_{52w}$) of the widest of the wide sections is within the following range: 0.48≤$W_{51n}$/$W_{52w}$≤0.68.

6. The WGP of claim 5, wherein two of the three wide sections, not between the two narrow sections, are located at outer ends of the reflective rib.

7. The WGP of claim 5, wherein the WGP has the following performance characteristics: Tp≥91% and Ts≤0.04 at 450 nm wavelength, where Tp is a percent transmission of a primarily transmitted polarization and Ts is a percent transmission of an opposite polarization.

8. The WGP of claim 5, wherein:
the array of wires having an aspect ratio (AR) of ≥1.8, where AR=$Th_R$/P, $Th_R$ is a thickness of the wires measured perpendicular to the face of the substrate, and P is a pitch of the array of wires.

9. The WGP of claim 5, wherein each wire consists essentially of the reflective rib.

10. The WGP of claim 5, wherein:
the channels are air-filled; and
the reflective rib having a proximal end facing the substrate and a distal end opposite of the proximal end and farthest from the substrate, the distal end being flat and parallel to the face of the substrate.

11. The WGP of claim 10, wherein the channels are air-filled from the proximal end to the distal end of the wires.

12. A reflective wire grid polarizer (WGP) comprising:
an array of wires on a face of a substrate, with channels between adjacent wires;
each wire including a reflective rib;
the reflective rib being wider at a distal end farthest from the substrate than at a proximal end closest to the substrate, a taper angle of sidewalls of the reflective rib, relative to a plane perpendicular to the face of a substrate and parallel with the array of wires, is within the following range: 2°≤taper angle≤4°; and
the array of wires having an aspect ratio (AR) of ≥1.8, where AR=$Th_R$/P, $Th_R$ is a thickness of the wires measured perpendicular to the face of the substrate, and P is a pitch of the array of wires.

13. The WGP of claim 12, wherein each wire consists essentially of the reflective rib.

14. The WGP of claim 12, wherein:
the channels are air-filled; and
the reflective rib having a proximal end facing the substrate and a distal end opposite of the proximal end and farthest from the substrate, the distal end being flat and parallel to the face of the substrate.

15. The WGP of claim 14, wherein the channels are air-filled from the proximal end to the distal end of the wires.

* * * * *